Aug. 17, 1943.  F. J. MILLER  2,326,876
RELEASABLE SINKER FOR USE WITH FISHING TACKLE
Filed Jan. 6, 1942
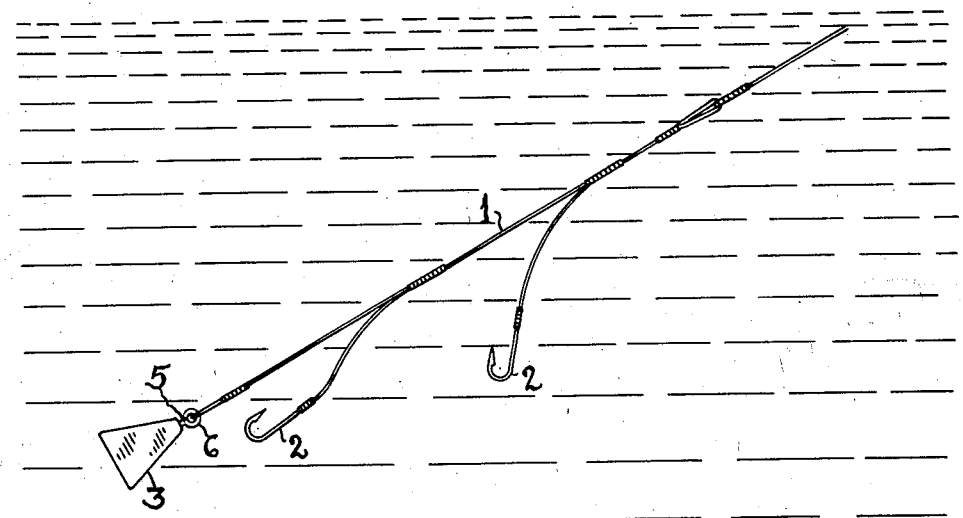
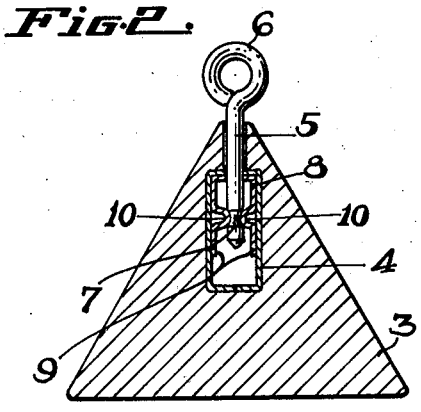
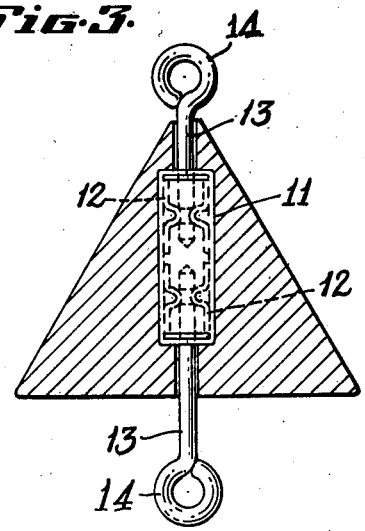
INVENTOR.
FRED J. MILLER
BY J. E. Trabucco
ATTORNEY Patented Aug. 17, 1943

2,326,876

UNITED STATES PATENT OFFICE 2,326,876

RELEASABLE SINKER FOR USE WITH FISHING TACKLE

Fred J. Miller, San Francisco, Calif.

Application January 6, 1942, Serial No. 425,794

4 Claims. (Cl. 43—52)

This invention relates to releasing devices for fishing lines, and more particularly to an improved sinker having releasable means for fishing lines embodied therein.

An object of my invention is to provide an improved sinker having a releasing device embodied therein, which, when the sinker is unreleasably caught and held in an inaccessible position beneath the surface of the water wherein the fishing operation is carried on, enables a fisherman to detach the fishing line and effect the recovery of the line and the hooks it carries.

With this and other objects in view, the present invention consists of certain novel features of construction, combination and arrangement of parts to be hereinafter more particularly described.

In the accompanying drawing:

Fig. 1 shows my invention in operation;

Fig. 2 is a sectional view of a sinker having a releasing device embodied therein; and Fig. 3 is a sectional view of a modified form of my invention showing a sinker having a duplex releasing device embodied therein.

Referring to the drawing, the numeral 1 designates a fishing line which is equipped with fishing hooks 2 and a sinker 3. The sinker is provided with releasing means, which permits the release and recovery of the line and its attached hooks when the sinker is caught and held in an inaccessible position beneath the surface of the water wherein the fishing operation is carried on.

Imbedded within the body of the sinker is a releasing device for the fishing lines comprising an elongated casing 4 which is preferably rectangular or square in cross section. One end of the casing has a suitable opening which is in registry with an opening in the sinker, and slidably extending through said openings is a rod 5. The rod 5 is provided at one end with an eye 6 to which the end of the line 1 is normally fastened. The opposite end of the rod is pointed, and an annular notch or groove 7 is formed therein near its pointed end. Located inside the casing is a rod engaging U-shaped member 8 made preferably from flexible metal such as copper, brass, or rust-proof steel, having an opening in its central part and substantially parallel legs 9 which are formed with inwardly protruding parts 10 that are adapted to enter the groove 7 of the rod and thereby normally prevent the said rod from being detached from the casing 4. In constructing the releasing device, a sheet of copper, brass or rust-proof metal is first cut into the proper shape and then formed into a casing of the kind shown and described. The rod engaging member 8 is preferably positioned in the casing prior to the closing of the ends thereof, and the pointed end of the rod 5 is then passed through the aligned holes in the adjacent ends of the casing and the member 8, after which it is pressed inwardly until its groove 7 receives the inwardly protruding parts 10 of the legs 9. The various parts of the releasing device may be assembled in other ways if desired. When the sinker is cast, the releasing device is suitably positioned in the mold before the lead is poured into the latter, and in this way the casing is firmly imbedded in the sinker. The hole in the sinker leading to the aligned openings in the member 8 and the casing 4 may be formed when the casting operation is carried out, or the sinker may be cast without the said hole and then drilled to provide the same. The rod engaging member 8 is preferably made so as to permit the release of the rod 5 only when a predetermined pull is exerted on the line 1. In ordinary practice the legs 9 of the rod engaging member 8 will not give way to permit the release of the grooved rod 5 until there is exerted a predetermined outward pull upon the latter. The particular number of pounds pull required to effect the release of the rod 5 from the engaging legs 9 of the member 8, is preferably such that a release of the line from the sinker will not be effected during the normal fishing operation, but only when the sinker becomes lodged in a crevice or is caught in some other way. In the event the sinker becomes lodged in some inaccessible structure while fishing, the line and hooks may be detached therefrom by exerting a suitable pull on the line. The sinker and a part of the releasing device is lost when the rod 5 becomes released from the legs 9 of the member 8, but the line, its leader and the hooks, which represent a substantial part of the fishing tackle, are salvaged.

In Fig. 3 a substantially longer casing 11 is shown as being imbedded inside the sinker 3. In this particular embodiment of my invention there are provided two rod engaging members 12 of the kind described inside the casing 11, and there are also provided two rods 13, one extending through an oversized opening in the sinker leading to one end of the casing, and the other extending through another oversized opening in the sinker leading to the opposite end of the casing. The free ends of the rods 13 are provided with eyelets 14.

The sinkers comprising a part of my invention may assume any desired shape, it being understood that the drawing is intended for illustration purposes only and does not define the scope of my invention.

In my co-pending application filed February 10, 1941, Serial No. 378,210 entitled "Releasing device for fishing lines," I have shown, described and claimed a releasing device not imbedded in a sinker, but one which is interposed between the latter and the end of a fishing line. The present application is a continuation in part of my said application Serial No. 378,210.

Having described my invention, what I claim is:

1. In a sinker, a weighted body, a casing imbedded in the body, a member removably extending into the casing, and resilient means in the casing for detachably engaging with and normally holding the member, the said means being adapted to release the member when a predetermined pull is exerted on the said member.

2. In a sinker, a weighted body, a casing imbedded in the body, an elongated member removably extending into the casing, having a notched end which is normally positioned in the casing, and a flexible member in the casing for releasably engaging with the notched end of the elongated member, the said flexible member being so constructed and arranged as to allow the detachment of the elongated member when a predetermined pull is exerted thereon.

3. In a sinker, a weighted body, a rod removably extending into the body having means at one end for the attachment of a fishing line, and resilient means anchored in the weighted body for releasably engaging with and normally holding the said rod, the said last mentioned means being so constructed and arranged as to permit the release of the rod when a predetermined pull is exerted thereon.

4. In a sinker, a weighted body, a connecting member normally extending into the weighted body for detachably connecting a fishing line to the weighted body, and resilient means anchored to and positioned inside the weighted body for releasably engaging with and holding the connecting member, the said means being so constructed and arranged as to allow the detachment of the connecting member from the weighted body when a predetermined pull is exerted in a certain direction on the connecting member.

FRED J. MILLER